US012656464B2

(12) United States Patent
Chung et al.

(10) Patent No.: US 12,656,464 B2
(45) Date of Patent: Jun. 16, 2026

(54) OPTICAL TIME-OF-FLIGHT SENSOR, METHOD, AND PROCESSING CIRCUIT CAPABLE OF AVOIDING MISJUDGMENT OF CHANNEL SAMPLING

(71) Applicant: PixArt Imaging Inc., Hsin-Chu City (TW)

(72) Inventors: Yueh-Lin Chung, Hsin-Chu City (TW); Tso-Sheng Tsai, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 1074 days.

(21) Appl. No.: 17/718,250

(22) Filed: Apr. 11, 2022

(65) Prior Publication Data

US 2023/0324524 A1 Oct. 12, 2023

(51) Int. Cl.
*G01S 7/4865* (2020.01)
*G01S 17/10* (2020.01)
*G01S 17/894* (2020.01)

(52) U.S. Cl.
CPC ............ *G01S 7/4865* (2013.01); *G01S 17/10* (2013.01); *G01S 17/894* (2020.01)

(58) Field of Classification Search
CPC ....... G01S 7/4865; G01S 17/894; G01S 17/10
See application file for complete search history.

(56) References Cited

U.S. PATENT DOCUMENTS 5,471,215 A * 11/1995 Fukuhara .............. G01S 7/2926
342/72
2015/0285625 A1* 10/2015 Deane ................... G01S 7/4816
348/140

2018/0308881 A1 10/2018 Hynecek
2020/0174105 A1* 6/2020 Yin ........................ G01S 7/4914
2021/0124032 A1* 4/2021 Moore .................... G01S 17/32

FOREIGN PATENT DOCUMENTS

CN 110389333 A 10/2019

OTHER PUBLICATIONS

Logic Gate, Wikipedia, Jun. 13, 2021 Version (https://web.archive.org/web/20210613073810/https://en.wikipedia.org/wiki/Logic_gate) (Year: 2021).*
Hwang, E, 2010, Latches and Flip-flops (https://www.cs.ucr.edu/~ehwang/courses/cs120b/flipflops.pdf) (Year: 2010).*

* cited by examiner

*Primary Examiner* — Isam A Alsomiri
*Assistant Examiner* — Benjamin Wade Clouser
(74) *Attorney, Agent, or Firm* — Winston Hsu

(57) ABSTRACT

An optical time-of-flight sensor includes a sensor array and a channel sampling circuit. The channel sampling circuit is arranged for receiving a photon pulse signal, generated from a sensor unit of the sensor array, receiving a first channel selection signal to generate a first freezing signal, generating a first channel event signal to a first counting circuit in response to the first freezing signal and the photon pulse signal, and receiving the first channel event signal to generate and count a pulse number of the photon pulse signal received by the first channel; when a rising edge of the photon pulse signal occurs, the first freezing signal is kept at a previous state until a falling edge of the photon pulse signal occurs.

16 Claims, 7 Drawing Sheets

FIG. 7

OPTICAL TIME-OF-FLIGHT SENSOR, METHOD, AND PROCESSING CIRCUIT CAPABLE OF AVOIDING MISJUDGMENT OF CHANNEL SAMPLING

BACKGROUND OF THE INVENTION

1. Field of the Invention

The invention relates a time-of-flight (TOF) distance detection scheme, and more particular to an optical time-of-flight sensor, method, and corresponding processing circuit.

2. Description of the Prior Art

Generally speaking, a conventional time-of-flight distance detection device may adopt single-photon avalanche diode (SPAD) units to sense and sample the reflected photons so as to estimate the distance between a target object and the conventional distance detection device. However, if a photon's arriving time is close to the time of the channel selection's switching, the performance of the conventional distance detection device inevitably will be affected due to misjudgments of channel sampling.

SUMMARY OF THE INVENTION

Therefore one of the objectives of the invention is to provide an optical time-of-flight sensor, a corresponding method, and a corresponding processing circuit, to solve the above-mentioned channel misjudgment problems.

According to the embodiments of the invention, an optical time-of-flight sensor is disclosed. The sensor comprises a sensor array and a first channel sampling circuit. The sensor array has a plurality of sensor units. The first channel sampling circuit corresponds to a first channel and is coupled to the sensor array, and it comprises a first freezing circuit and a first counting circuit. The first freezing circuit is arranged for receiving a photon pulse signal, generated from a sensor unit of the sensor array, and a first channel selection signal to generate a first freezing signal, and arranged for generating a first channel event signal to a first counting circuit in response to the first freezing signal and the photon pulse signal. The first counting circuit is coupled to the first freezing circuit, and used for receiving the first channel event signal to generate and count a pulse number of the photon pulse signal received by the first channel. When a rising edge of the photon pulse signal occurs, the first freezing signal is kept at a previous state until a falling edge of the photon pulse signal occurs.

According to the embodiments, a processing circuit disposed in an optical time-of-flight sensor is disclosed. The processing circuit is externally coupled to a sensor array of the optical time-of-flight sensor, and the processing circuit comprises the above-mentioned first channel sampling circuit.

According to the embodiments, a method of an optical time-of-flight sensor is disclosed. The method comprises: providing a sensor array having a plurality of sensor units; and providing and using a first channel sampling circuit corresponding to a first channel to perform: receiving a photon pulse signal, generated from a sensor unit of the sensor array, and a first channel selection signal to generate a first freezing signal; generating a first channel event signal to a first counting circuit in response to the first freezing signal and the photon pulse signal; and, using the first counting circuit to receive the first channel event signal to generate and count a pulse number of the photon pulse signal received by the first channel; when a rising edge of the photon pulse signal occurs, the first freezing signal is kept at a previous state until a falling edge of the photon pulse signal occurs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram of a scenario example of the operations of the n sets of channel sampling circuits in FIG. 6 according to an embodiment of the invention.

DETAILED DESCRIPTION

The invention aims at providing a technical solution of a time-of-flight (TOF) sensor/detector based on the operations of multiple sensor units such as multiple single-photon avalanche diode (SPAD) units to detect/measure the distance between a target object and the TOF sensor. The provided TOF sensor can significantly improve the accuracy of the distance estimation operation by avoiding channel misjudgments without double counting the number of arrived photon(s).

Figure 1:
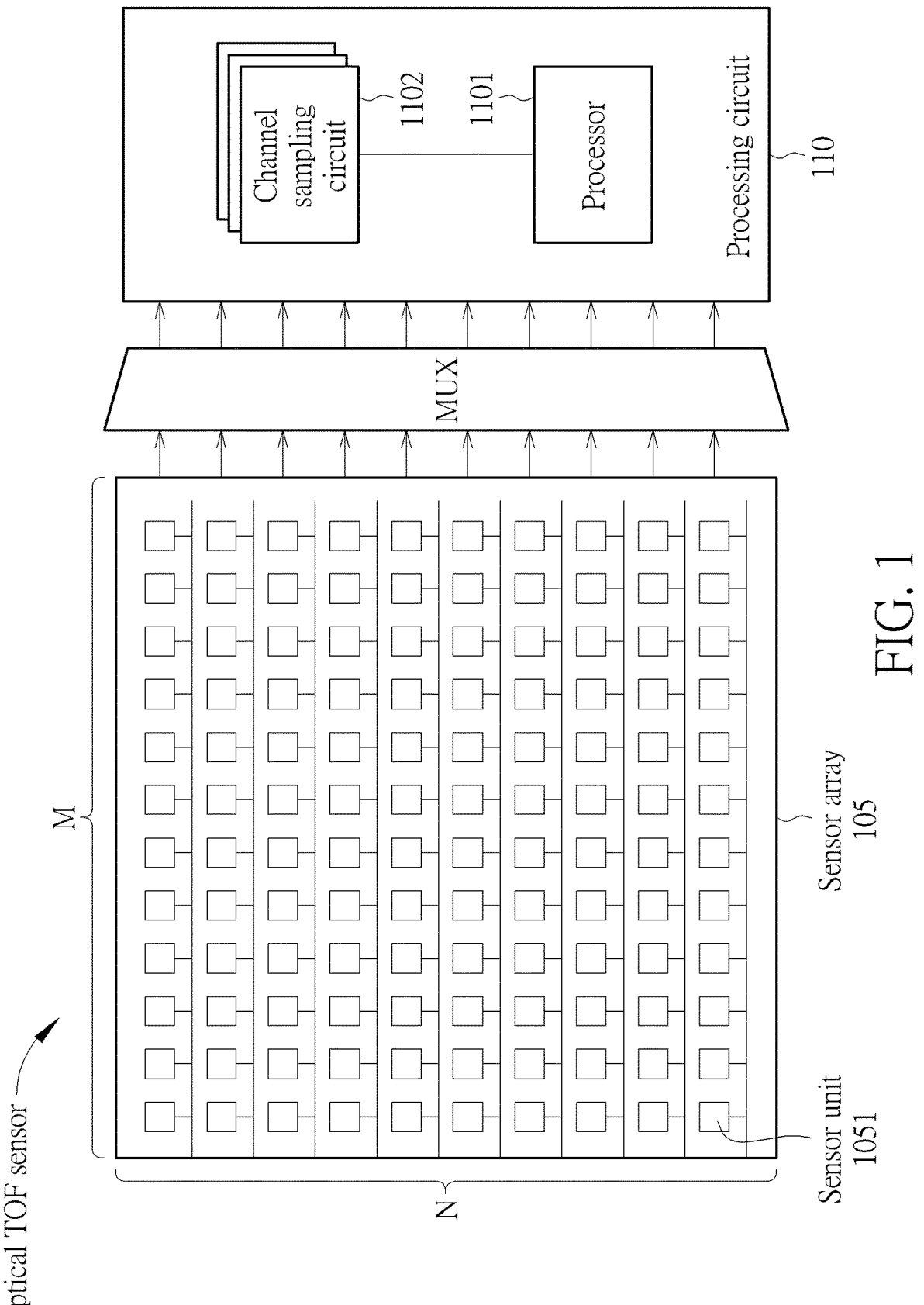
FIG. 1 is a block diagram of an optical sensor device such as an optical time-of-flight (TOF) sensor/detector according to an embodiment of the invention.

FIG. 1 is a block diagram of an optical sensor device such as an optical time-of-flight (TOF) sensor/detector 100 according to an embodiment of the invention. The optical TOF sensor 100 comprises a sensor array 105, a multiplexer MUX, and a processing circuit 110. The sensor array 105 comprises a plurality of sensor units 1051 such as pixel units each comprising an SPAD unit (not shown in FIG. 1). For example, the sensor array 105 comprises N×M SPAD sensor units (i.e. sensor units) 1051. Each SPAD sensor unit 1051 is configured in an avalanche mode and in response to receiving a photon of the reflected light signal to generate and produce a detection (avalanche) pulse signal PXO. The detection pulse signals PXO, generated by the different SPAD sensor units 1051, are transmitted from the sensor array 105 to the processing circuit 110 through the multiplexer MUX. It should be noted that, the multiplexer MUX may be optional; that is, in other embodiments, the sensor array 105 may be coupled to the processing circuit 110.

The processing circuit 110 is used as a time measurement circuit which may use one or more different independent time channels to sample the detection pulse signal (s) PXO of the SPAD sensor unit (s) 1051 to more accurately measure the time interval(s) of the arrived photon(s) so as to more accurately calculate or detect the distance between the optical TOF sensor 100 and a target object to be detected. In practice, the processing circuit 110 comprises a processor 1101 and one or more channel sampling circuits 1102 corresponding to one or more time channels. The number of time channel(s) and corresponding channel sampling circuit(s) 1102 is not a limitation. For example (but not limited), the number of time channels may be configured as 256, and a photon receiving time interval is divided into 256 time slots which are respectively associated with 256 different channel sampling circuits 1102. Each or a channel sampling circuit 1102 is used to sample, count, and/or record the arrived photon(s) over a specific/configured time channel (i.e. a specific time slot) to generate and obtain a number of photons arrived during the specific/configured time slot. The channel sampling circuit(s) 1102 is/are arranged to output the counted number(s) of arrived photons to the processor 1101, and the different counted number of arrived photons can form a histogram. The processor 1101 is arranged to calculate or estimate the distance based on the histogram. For example (but not limited), if a maximum counted number of arrive photons corresponds to a particular time slot, then the processor 1101 can calculate the flight time of the photons based on the particular time slot and accordingly estimate the distance between the optical TOF sensor 100 and the object to be detected based on the flight time.

Figure 2:
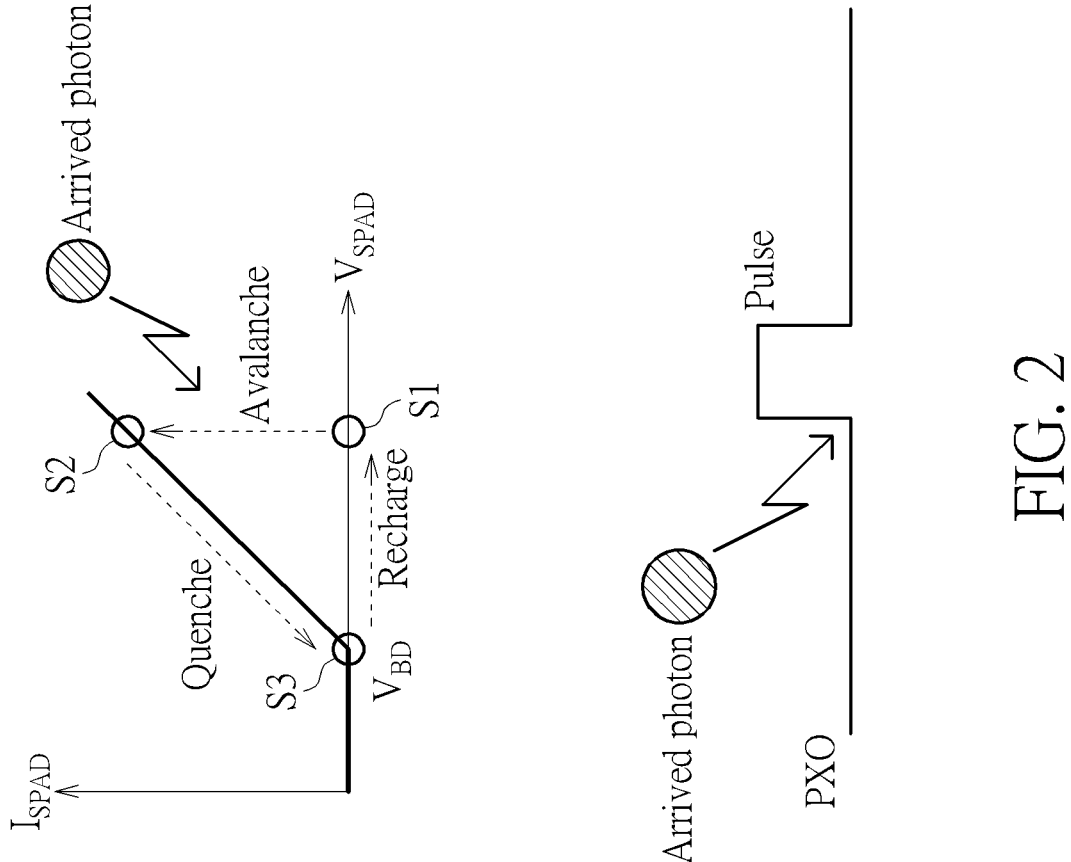
FIG. 2 is a diagram showing the example of the operation of an SPAD sensor unit and the example of a detection pulse signal PXO generated by the SPAD sensor unit according to an embodiment of the invention.

FIG. 2 is a diagram showing the example of the operation of an SPAD sensor unit 1051 and the example of a detection pulse signal PXO generated by the SPAD sensor unit 1051 according to an embodiment of the invention. In the top of FIG. 2, the SPAD sensor unit 1051 comprises a photodiode (PD) that is configured to operate in a Geiger mode in which a voltage difference $V_{SPAD}$ across two ends of the photodiode is configured to be higher than the reverse breakdown voltage $V_{BD}$, e.g. the state S1 in FIG. 2. In this situation, if a photon arrives at the SPAD sensor unit 1051, then an avalanche breakdown effect is generated and the current $I_{SPAD}$ passing through the SPAD sensor unit 1051 will be increased from zero to the state S2 in FIG. 2. Then, the SPAD sensor unit 1051 is quenched and the current $I_{SPAD}$ will become zero again, i.e. the state S3. Then, the SPAD sensor unit 1051 will be reset, and the state will switch from the state S3 to the state S1 (i.e. an initial state). The SPAD sensor unit 1051 converts the arrived photon into a pulse wave signal, i.e. a detection pulse signal PXO shown in the bottom of FIG. 2, and it outputs the detection pulse signal PXO from the sensor array 105 to the processing circuit 110.

Figure 3:
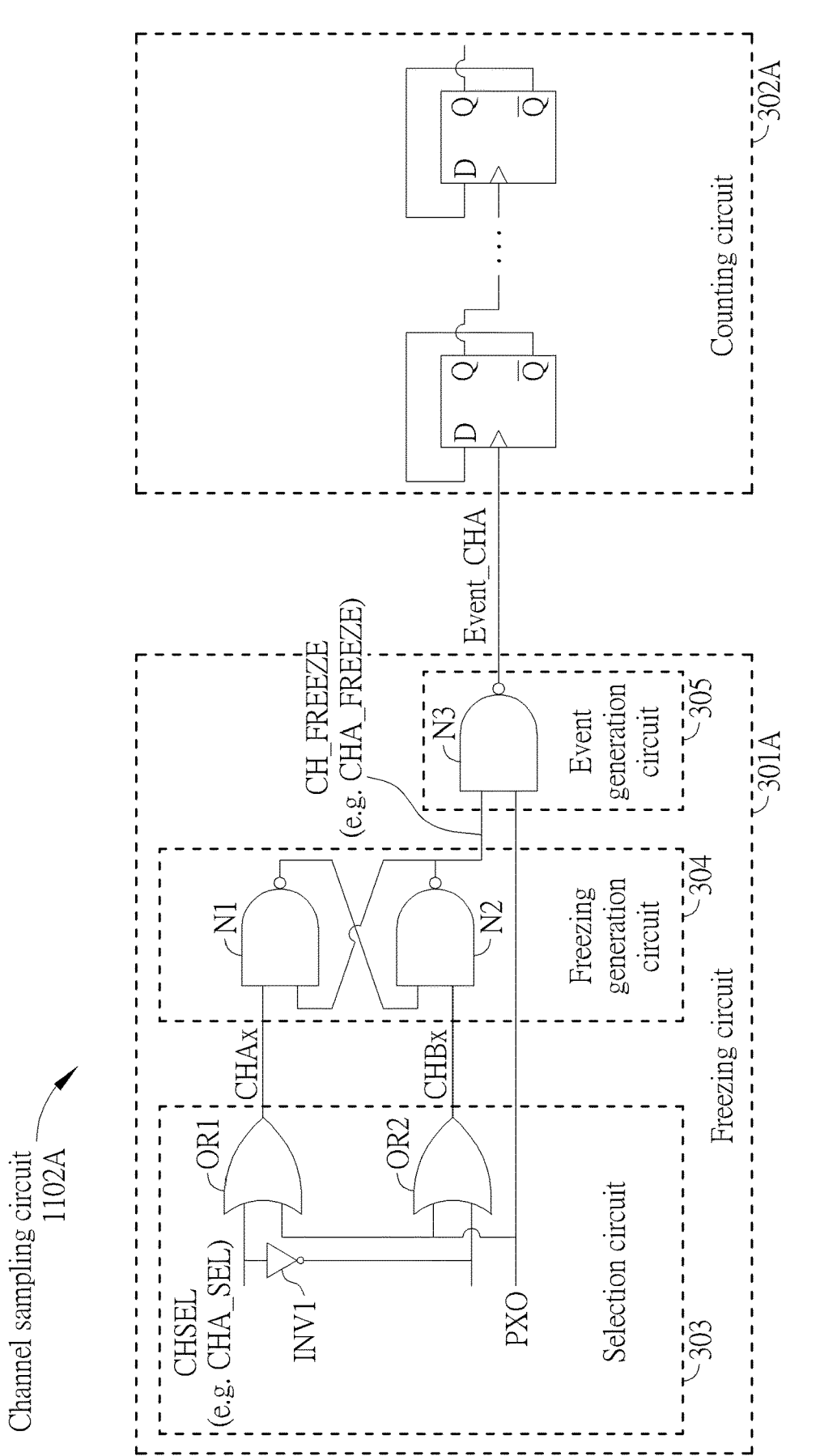
FIG. 3 is a circuit diagram of only one channel sampling circuit comprised by the processing circuit according to an embodiment of the invention.

To avoid double counting the number of arrived photon (s) (i.e. pulse signal(s)) and/or avoid misjudgments of photons, a novel circuit structure employed by the channel sampling circuit(s) 1102 of the processing circuit 110 is provided. In one embodiment, the processing circuit 110 may comprise only one channel sampling circuit. FIG. 3 is a circuit diagram of only one channel sampling circuit 1102A comprised by the processing circuit 110 according to an embodiment of the invention. In FIG. 3, the channel sampling circuit 1102A is coupled to the sensor array 105 of FIG. 1, and it comprises a first freezing circuit 301A and a first counting circuit 302A.

The freezing circuit 301A is arranged for receiving a detection pulse signal (i.e. photon pulse signal) PXO, generated from the SPAD sensor unit 1051 of the sensor array 105, receiving a channel selection signal CHSEL such as a first channel selection signal CHA_SEL associated with a first channel CHA to generate a freezing signal such as a first freezing signal CHA_FREEZE associated with the first channel CHA, and for generating a channel event signal such as a first channel event signal Event_CHA associated with the first channel CHA to the counting circuit 302A in response to the freezing signal CHA_FREEZE and the photon pulse signal PXO. The counting circuit 302A is coupled to the freezing circuit 301A, and used for receiving the first channel event signal Event_CHA to generate and count a pulse number of the photon pulse signal PXO received by a first channel CHA. When a rising edge of the photon pulse signal PXO occurs, the first freezing signal CHA_FREEZE is kept at a previous state until a falling edge of the photon pulse signal PXO occurs.

The freezing circuit 301A is used to determine whether to temporarily lock or keep the state of such channel CHA for a specific time interval which can be variable, e.g. the time of the pulse width of the photon pulse signal PXO, until the end (e.g. its falling edge) of photon pulse signal PXO occurs. If the photon pulse signal PXO occurs and it is determined to keep the channel state, then no event signals such as a signal with a high logic level will be outputted from the freezing circuit 301A to the counting circuit 302A. In this situation, the number counted by the counting circuit 302A is not incremented by one. Instead, if the photon pulse signal PXO occurs and it is determined to not keep the channel state, then an event signal such as a signal with a high logic level will be outputted from the freezing circuit 301A to the counting circuit 302A. In this situation, the number counted by the counting circuit 302A is incremented by one.

In practice, the freezing circuit 301A comprises a selection circuit 303, a freezing generation circuit 304, and an event generation circuit 305. The counting circuit 302A comprises a plurality of flip-flops such as D-type flip-flops connected in series, and the D-type flip-flops are used as multiple delay stages such as delay buffers.

The selection circuit 303 is coupled to the first channel selection signal CHA_SEL and the photon pulse signal PXO, for generating an inverted channel selection signal $\overline{CHA\_SEL}$ based on the first channel selection signal CHA_SEL, and for generating a first intermediate selection signal CHAx and a second intermediate selection signal CHBx based on the first channel selection signal CHA_SEL, the inverted channel selection signal $\overline{CHA\_SEL}$, and the photon pulse signal PXO. In practice, the selection circuit 303 may comprise a first OR gate OR1, an inverter INV1, and a second OR gate G2. As shown in FIG. 3, the first OR gate OR1 has a first input coupled to the first channel selection signal CHA_SEL, a second input coupled to the photon pulse signal PXO, and an output. The inverter INV1 has an input coupled to the first channel selection signal CHA_SEL and an output for generating the inverted channel selection signal $\overline{CHA\_SEL}$. The second OR gate OR2 has a first input coupled to the output of the inverter INV1, a second input coupled to the photon pulse signal PXO, and an output. The first and second intermediate selection signals CHAx and CHBx are generated at the outputs of the first and second OR gates OR1 and OR2.

The freezing generation circuit 304 is coupled to selection circuit 303, and it is used for generating the first freezing signal CHA_FREEZE in response to the first and second intermediate selection signals CHAx and CHBx. In practice, the freezing generation circuit 304 may comprise an S-R NAND latch (S-R flip-flop) formed by a first NAND gate N1 and a second NAND gate N2. The first NAND gate N1 has a first input coupled to the first intermediate selection signal CHAx, a second input coupled to the generated first freezing signal CHA_FREEZE, and an output. The second NAND gate N2 has a first input coupled to the second intermediate selection signal CHBx, a second input coupled to the output of the first NAND gate N1, and an output for generating the first freezing signal CHA_FREEZE.

The event generation circuit 305 is coupled to the freezing generation circuit 304, and it is used for generating the first channel event signal Event_CHA to the counting circuit 302A in response to the first freezing signal CHA_FREEZE and the photon pulse signal PXO. In practice, the event generation circuit 305 may comprise a third NAND gate N3. The third NAND gate N3 has a first input coupled to the first freezing signal CHA_FREEZE, a second input coupled to the photon pulse signal PXO, and an output for generating the first channel event signal Event_CHA to the counting circuit 302A.

The following table shows examples of the different states of a time channel based on the operations of the circuit components of the channel sampling circuit 1102A in FIG. 3 according to an embodiment of the invention:

| CHSEL | PXO | CH_FREEZE | Channel state |
|---|---|---|---|
| 1 | 0 | 0 | Record |
| 1 | 1 | Keep | Keep previous state |
| 0 | 0 | 1 | Ignore |
| 0 | 1 | Keep | Keep previous state |

As mentioned above, when the channel selection signal CHSEL is at the high level '1' (i.e. the corresponding channel now is selected at this timing), if the photon pulse signal PXO is at a low level '0' (i.e. no photons now arrive), then the freezing signal CH_FREEZE is at the low level '0' and the channel state is at a record state; in this situation, the channel sampling circuit 1102A records that no photons now arrive, and the event generation circuit 305 does not generate the event signal Event_CHA to the counting circuit 302A so that the number counted by the counting circuit 302A is kept at the same number and is not incremented by one. Then, in the same condition of the channel selection signal CHSEL at the high level '1', if a rising edge of the photon pulse signal PXO occurs (i.e. it becomes at the high level '1' due to that a photon now arrives), then the freezing signal CH_FREEZE is configured to keep a previous state (e.g. the low level '0') and the channel state is kept at a previous state such as the record state; in this situation, the channel sampling circuit 1102A records that such photon now arrives, and the event generation circuit 305 is arranged to generate the event signal Event_CHA to the counting circuit 302A so that the number counted by the counting circuit 302A is incremented by one. That is, no matter what level the photon pulse signal PXO is at, the channel sampling circuit 1102A is at the record state to record whether a photon arrives or not if the corresponding channel is selected (i.e. the channel selection signal CHSEL is at the high level '1').

In a different condition, when the channel selection signal CHSEL is at the low level '0' (i.e. the corresponding channel is not selected), if the photon pulse signal PXO is at the low level '0' (i.e. no photons now arrive), then the freezing signal CH_FREEZE is at the high level '1' and the channel state is at an ignore state at which the channel sampling circuit 1102A is arranged to not record whether a photon arrives or not, i.e. ignoring photons, and the event generation circuit 305 does not generate the event signal Event_CHA to the counting circuit 302A so that the number counted by the counting circuit 302A is kept at the same number and is not incremented by one. Then, in the same condition of the channel selection signal CHSEL at the low level '0', even though a rising edge of the photon pulse signal PXO occurs (i.e. it becomes at the high level '1' due to that a photon now arrives), then the freezing signal CH_FREEZE is configured to keep a previous state (e.g. the high level '1') and the channel state is kept at a previous state such as the ignore state since the channel is not selected; in this situation, the channel sampling circuit 1102A is also arranged to not record whether a photon arrives or not, and the event generation circuit 305 does not generate the event signal Event_CHA to the counting circuit 302A so that the number counted by the counting circuit 302A is kept at the same number and is not incremented by one. The channel is kept at the previous state until the falling edge of photon pulse signal PXO occurs. It should be noted that in this situation the occurrence of the photon may be recorded by another different channel which is selected and is not recorded by the channel corresponding to the channel sampling circuit 1102A. Thus, this achieves keeping an enough time interval, which can be variable in response to the pulse width of the photon pulse signal PXO, for the channel, and avoids channel misjudgments.

Figure 4:
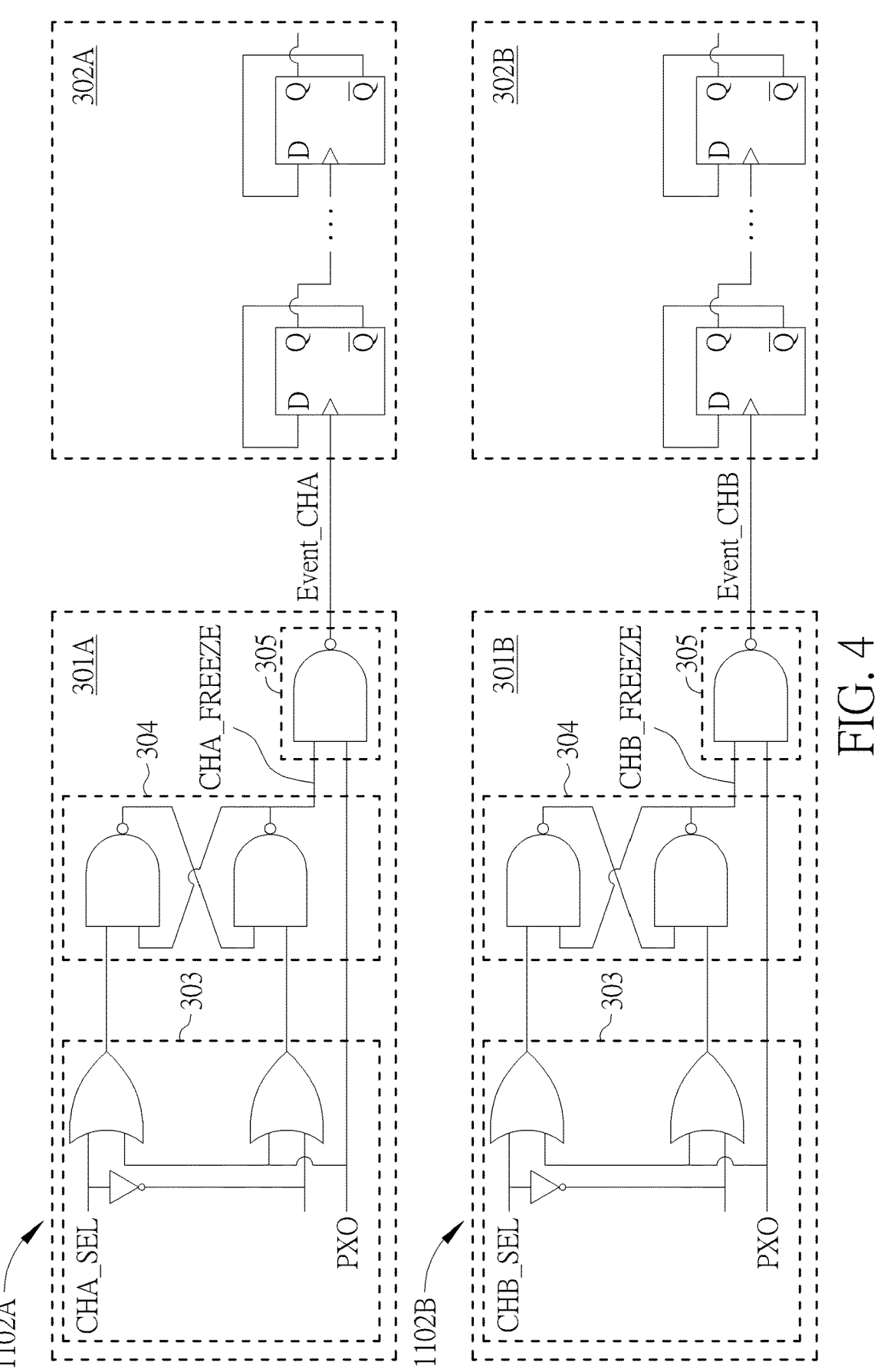
FIG. 4 is a circuit diagram of the circuit components of two channel sampling circuits comprised by the processing circuit in FIG. 1 according to an embodiment of the invention.

In another embodiment, the processing circuit 110 in FIG. 1 may comprise two channel sampling circuits respectively corresponding to two different time channels. FIG. 4 is a circuit diagram of the circuit components of two channel sampling circuits 1102A and 1102B comprised by the processing circuit 110 in FIG. 1 according to an embodiment of the invention. In FIG. 4, the processing circuit 110 in FIG. 4 comprises the first channel sampling circuit 1102A and a second channel sampling circuit 1102B. Similarly, the second channel sampling circuit 1102B corresponds to a second channel different from the first channel, and it is coupled to the sensor array 105 and comprises a second freezing circuit 301B and a second counting circuit 302B. The circuit elements/components of the second freezing circuit 301B and second counting circuit 302B are identical to those of the freezing circuit 301A and second counting circuit 302A, and are not detailed for brevity. A difference between freezing circuits 301A and 301B is that they are respectively associated with two different time channels, receive different channel selection signals CHA_SEL and CHB_SEL, generate different freezing signals CHA_FREEZE and CHB_FREEZE, and generate and output different channel event signals Event_CHA and Event_CHB into the counting circuits 301A and 302B respectively.

When the rising edge of the photon pulse signal PXO occurs, the freezing signal CHB_FREEZE is kept at a previous state until the falling edge of the photon pulse signal PXO occurs. For example, the freezing signal CHB_FREEZE is kept at the ignore state when the freezing signal CHA_FREEZE is kept at the record state. In addition, when the freezing signal CHB_FREEZE is at the ignore state, the freezing circuit 301B does not generate the channel event signal Event_CHB to the counting circuit 302B.

The following table shows examples of the different states of the two time channels CHA and CHB based on the operations of the circuit components of the channel sampling circuits 1102A and 1102B in FIG. 4 according to an embodiment of the invention:

| PXO | CHA_SEL | CHB_SEL | CHA_FREEZE | CHB_FREEZE | State CHA | State CHB |
|---|---|---|---|---|---|---|
| 0 | 0 | 1 | 1 | 0 | Ignore | Record |
| 0 | 1 | 0 | 0 | 1 | Record | Ignore |
| 1 | 0 | 1 | Keep | Keep | Keep | Keep |
| 1 | 1 | 0 | keep | Keep | Keep | Keep |

Figure 5:
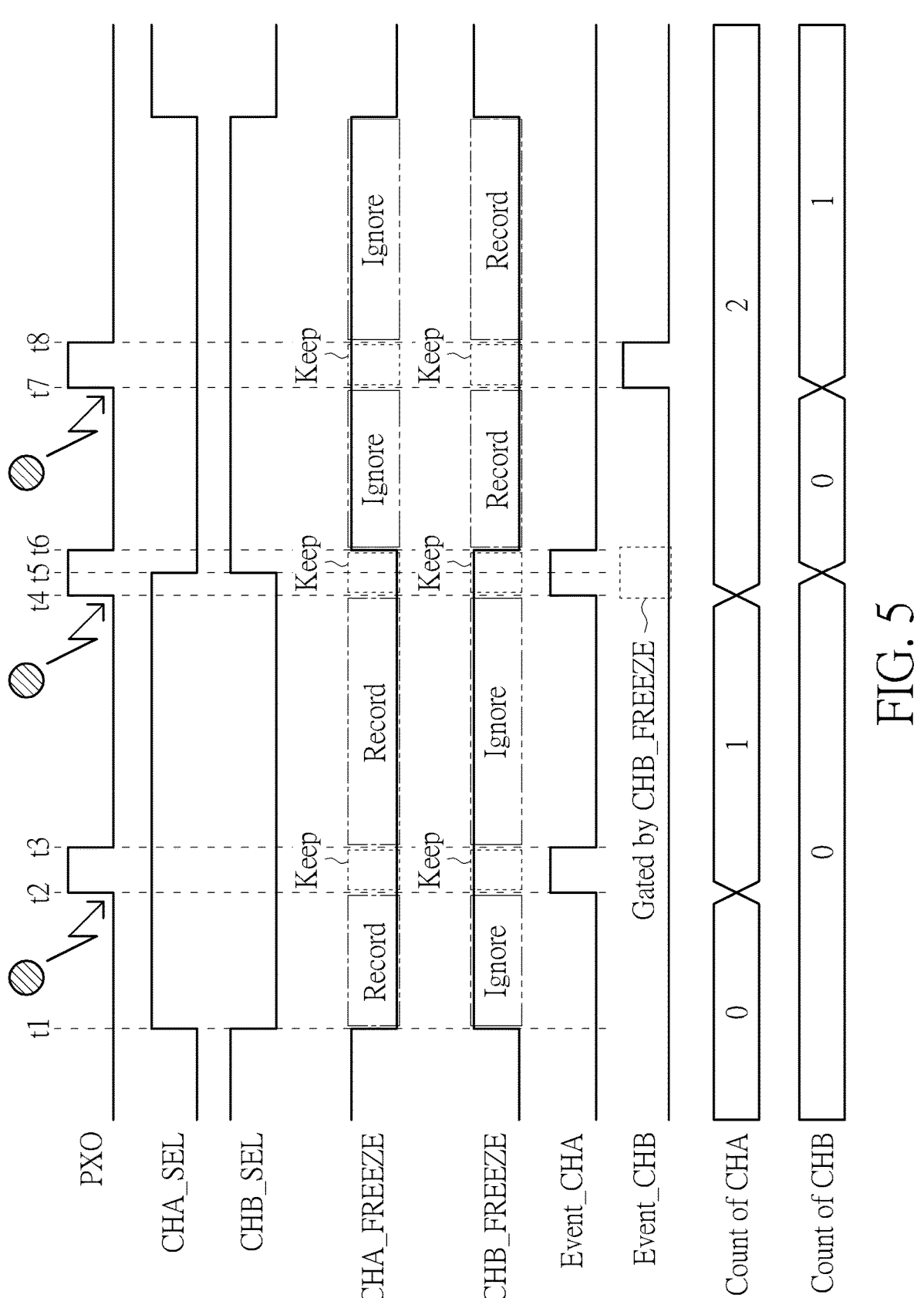
FIG. 5 is a diagram of a scenario example of the operations of the channel sampling circuits in FIG. 4 according to an embodiment of the invention.

FIG. 5 is a diagram of a scenario example of the operations of the channel sampling circuits 1102A and 1102B in FIG. 4 according to an embodiment of the invention. At time t1, the channel CHA is selected and the channel selection signal CHA_SEL is switched from the low level (i.e. '0') to the high level (i.e. '1'), and the channel CHB is not selected and channel selection signal CHB_SEL is switched from the high level to the low level. The levels of the channel selection signals CHA_SEL and CHB_SEL are altered. The freezing signal CHA_FREEZE is switched from the high level to the low level so that the channel CHA is or becomes at the record state. The freezing signal CHB_FREEZE is switched from the low level to the high level so that the channel CHB is or becomes at the ignore state.

At time t2, a rising edge of the photon pulse signal PXO corresponding to a first photon occurs, and the channel selection is not switched, i.e. the channel selection signals CHA_SEL and CHB_SEL are still respectively at the high level and low level. In this situation, the freezing signal CHA_FREEZE is kept at the previous state/level, i.e. the low level, so that the channel CHA is not locked. The freezing signal CHB_FREEZE is kept at the previous state/level, i.e. the high level, so that the channel CHB is locked at the ignore state. In this situation, the first photon is sampled and counted by the channel sampling circuit 1102A and is not sampled by the channel sampling circuit 1102B, so a pulse is generated at the channel event signal Event_CHA generated by the freezing circuit 301A and the counting number generated by the counting circuit 302A is incremented by one.

At time t3, a falling edge of the photon pulse signal PXO corresponding to the first photon occurs, and the channel selection is not switched. In this situation, the freezing signal CHA_FREEZE becomes at the low level, so that the channel CHA is at the record state. The freezing signal CHB_FREEZE becomes at the high level, so that the channel CHB is at the ignore state. The falling edge of the pulse generated at the signal channel event signal Event_CHA occurs.

At time t4, a rising edge of the photon pulse signal PXO corresponding to a second photon occurs, and the channel selection signals CHA_SEL and CHB_SEL are still respectively at the high level and low level. In this situation, the freezing signal CHA_FREEZE is kept at the previous state/level, i.e. the low level, so that the channel CHA is at the record state until the falling edge of the photon pulse signal PXO occurs. The freezing signal CHB_FREEZE is kept at the previous state/level, i.e. the high level, so that the channel CHB is locked at the ignore state until the falling edge of the photon pulse signal PXO occurs. In this situation, the second photon is sampled and counted by the channel sampling circuit 1102A and is not sampled by the channel sampling circuit 1102B, so a pulse is generated at the signal channel event signal Event_CHA generated by the freezing circuit 301A and the counting number generated by the counting circuit 302A becomes two.

At time t5, the channel selection performs switching, i.e. the channel selection signal CHA_SEL is switched from the high level to the low level and the channel selection signal CHB_SEL is switched from the low level to the high level. In this situation, the freezing signal CHA_FREEZE is kept at the previous state/level, i.e. the low level, so that the channel CHA is at the record state until the falling edge of the photon pulse signal PXO occurs. Even though the channel selection signal CHB_SEL is at the high level during the time interval between time t5 and t6 (i.e. the falling edge of the photon pulse signal PXO of the second photon), the freezing signal CHB_FREEZE is kept at the previous state/level, i.e. the high level, so that the channel CHB is locked at the ignore state until the falling edge of the photon pulse signal PXO occurs. Thus, the second photon is not sampled and counted by the channel sampling circuit 1102B.

At time t6, after a falling edge of the photon pulse signal PXO corresponding to the second photon occurs, the freezing signal CHA_FREEZE is switched from the low level to the high level, and the freezing signal CHB_FREEZE is switched from the high level to the low level, so that the channel CHA is switched from the state of keeping the previous state (the record state) into the ignore state while the channel CHB is switched from the state of keeping the previous state (the ignore state) into the record state. Since the level of the photon pulse signal PXO corresponding to the second photon has been switched into the low level, the second photon is sampled and counted by the channel sample circuit 1102A of the channel CHA but not sampled and counted by the channel sample circuit 1102B of the channel CHB. Accordingly, during a time period from time t4 to time t6, a pulse is generated at the channel event signal Event_CHA, and no pulses are generated at the channel event signal Event_CHB; that is, the channel event signal Event_CHB in this situation is gated by the freezing signal CHB_FREEZE.

At time t7, a rising edge of the photon pulse signal PXO corresponding to a third photon occurs, and the channel selection signals CHA_SEL and CHB_SEL are still respectively at the low level and high level. In this situation, the freezing signal CHA_FREEZE is kept at the previous state/level, i.e. the high level, so that the channel CHA is at the ignore state until the corresponding falling edge of the photon pulse signal PXO occurs. The freezing signal CHB_FREEZE is kept at the previous state/level, i.e. the low level, so that the channel CHB is locked at the record state until the corresponding falling edge of the photon pulse signal PXO occurs. In this situation, the third photon is sampled and counted by the channel sampling circuit 1102B of the channel CHB and is not sampled by the channel sampling circuit 1102A of the channel CHA, so a pulse is generated at the signal channel event signal Event_CHB generated by the freezing circuit 301B and the counting number generated by the counting circuit 302B is incremented as one.

At time t8, similarly, after the falling edge of the photon pulse signal PXO corresponding to the third photon occurs, the freezing signal CHA_FREEZE is switched from the state of keep the previous state into the ignore state, and the freezing signal CHB_FREEZE is switched from the state of keeping the previous state into the record state.

As mentioned above, the 'Keep' state means that the state of the corresponding time channel is kept at its previous state until a falling edge of the photon pulse signal PXO occurs when a rising edge of the photon pulse signal PXO arrives. If the previous state is the record state, the state of the corresponding time channel is kept at the record state until the falling edge of the photon pulse signal PXO arrives. If the previous state is the ignore state, the state of the corresponding time channel is kept at the ignore state until the falling edge of the photon pulse signal PXO arrives. Thus, an arrived photon will be recorded/sampled and counted by a time channel which is at the record state, and will be ignored and not counted by a time channel which is at the ignore state. By doing so, an arrived photon is sampled and counted by only one channel, so the channel misjudgment can be avoided.

Figure 6:
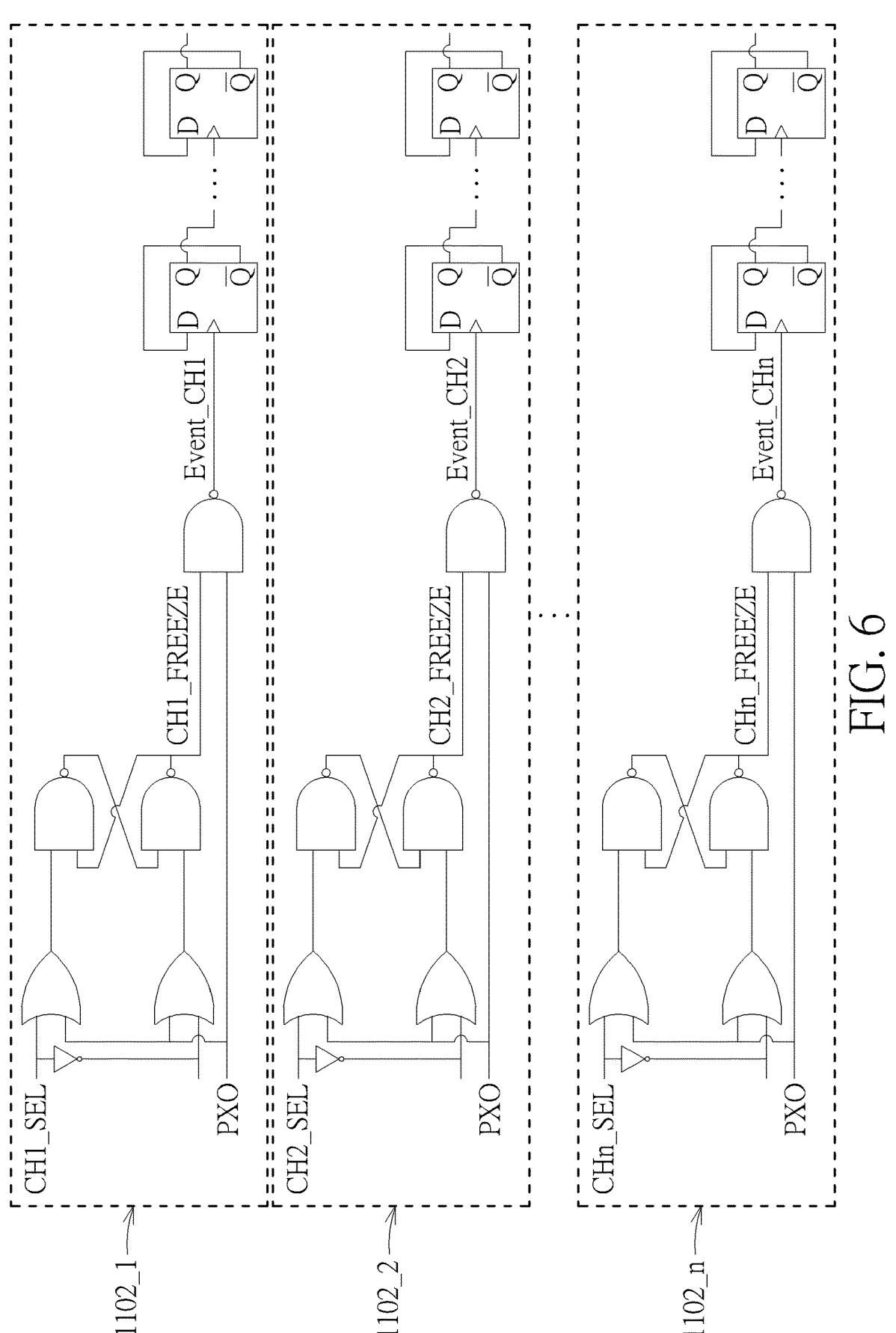
FIG. 6 is a circuit diagram of the circuit components of the n sets of channel sampling circuits comprised by the processing circuit in FIG. 1 according to an embodiment of the invention.

In other embodiment, the processing circuit 110 in FIG. 1 may comprise n sets of channel sampling circuits respectively corresponding to n different time channels. FIG. 6 is a circuit diagram of the circuit components of the n channel sampling circuits 1102_1, 1102_2, . . . , and 1102_$n$ comprised by the processing circuit 110 in FIG. 1 according to an embodiment of the invention. In FIG. 6, in addition to receiving the photon pulse signal PXO, the channel sampling circuits 1102_1, 1102_2, . . . , and 1102_$n$ are respectively arranged to receive the different channel selection signals CH1_SEL, CH2_SEL, . . . , and CHn_SEL which are independent. The channel sampling circuits 1102_1, 1102_2, . . . , and 1102_$n$ respectively generate the different freezing signals CH1_FREEZE, CH2_FREEZE, and CHn_FREEZE, and they generate different channel event signals Event_CH1, Event_CH2, . . . , and Event_CHn. The components and operations comprised by each channel sampling circuits 1102_1, 1102_2, . . . , and 1102_$n$ are similar to those of the channel sampling circuit 1102A, and are not detailed for brevity.

Figure 7:
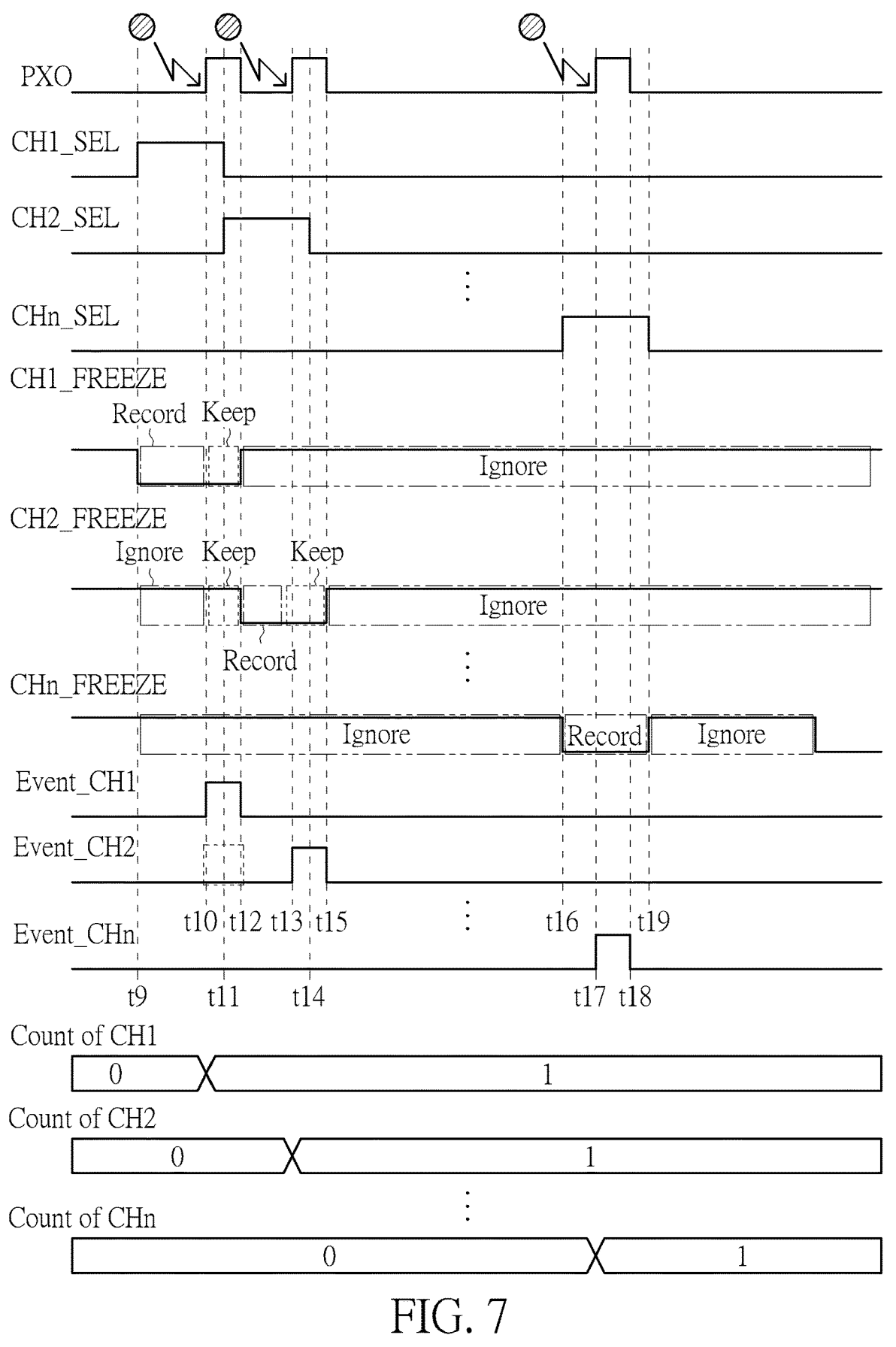

FIG. 7 is a diagram of a scenario example of the operations of the n sets of channel sampling circuits in FIG. 6 according to an embodiment of the invention. In FIG. 7, similarly, during a time period from time t9 to t11, the channel CH1 is selected while the other channels are not selected. A rising edge of the photon pulse signal PXO corresponding to a first photon occurs at time t10, so the first photon is sampled and counted by the channel sampling circuit of the channel CH1 and not sampled and counted by the different channel sampling circuit of the channel CH2 even though a channel selection performs switching at time t11 between the rising edge (at time t10) and falling edge (at time t12) of the [photo] photon pulse signal PXO corresponding to the first photon. Similarly, during a time period from time t11 to t14, the channel CH2 is selected while the other channels are not selected. A rising edge of the photon pulse signal PXO corresponding to a second photon occurs at time t13, so the second photon is sampled and counted by the channel sampling circuit of the channel CH2 and not sampled and counted by the different channel sampling circuits of the other channels even though a channel selection performs switching at time t14 between the rising edge (at time t13) and falling edge (at time t15) of the photon pulse signal PXO corresponding to the second photon. Also, during a time period from time t16 to t19, the channel CHn is selected while the other channels are not selected. A rising edge of the photon pulse signal PXO corresponding to a third photon occurs at time t17, so the third photon is sampled and counted by the channel sampling circuit of the channel CHn and not sampled and counted by the different channel sampling circuits of the other channels. The falling edge of the photon pulse signal PXO corresponding to the third photon occurs at time t18. As shown in FIG. 7, the channel event signals Event_CH1, Event_CH2, . . . , and Event_CHn respectively show the sample results of the different channels, and the counting numbers of the different channels CH1, CH2, . . . , and CHn are respectively incremented as one at time t10, t13, and t17.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical time-of-flight sensor, comprising:

a sensor array, having a plurality of sensor units; and a first channel sampling circuit corresponding to a first channel, coupled to the sensor array, comprising:

a first freezing circuit, for receiving a photon pulse signal, generated from a sensor unit of the sensor array, and a first channel selection signal to generate a first freezing signal, and for generating a first channel event signal to a first counting circuit in response to the first freezing signal and the photon pulse signal; and the first counting circuit, coupled to the first freezing circuit, for receiving the first channel event signal to generate and count a pulse number of the photon pulse signal received by the first channel;

wherein when a rising edge of the photon pulse signal occurs, the first freezing signal is kept at a previous state until a falling edge of the photon pulse signal occurs; and, the first freezing circuit comprises:

a selection circuit, coupled to the first channel selection signal and the photon pulse signal, for generating an inverted channel selection signal based on the first channel selection signal, and for generating a first intermediate selection signal and a second intermediate selection signal based on the first channel selection signal, the inverted channel selection signal, and the photon pulse signal; the selection circuit comprises:

a first OR gate, having a first input coupled to the first channel selection signal, having a second input coupled to the photon pulse signal, and having an output;

an inverter, having an input coupled to the first channel selection signal, and having an output for generating the inverted channel selection signal based on the first channel selection signal; and a second OR gate, having a first input coupled to the output of the inverter, having a second input coupled to the photon pulse signal, and having an output;

the first OR gate receiving the first channel selection signal and the photon pulse signal to generate the first intermediate selection signal at the output of the first OR gate, and the second OR gate receiving the inverted channel selection signal and the photon pulse signal to generate the second intermediate selection signal at the output of the second OR gate;

a freezing generation circuit, coupled to selection circuit, for generating the first freezing signal in response to the first intermediate selection signal and the second intermediate selection signal; and an event generation circuit, coupled to the freezing generation circuit, for generating the first channel event signal to the first counting circuit in response to the first freezing signal and the photon pulse signal.

2. The optical time-of-flight sensor of claim 1, further comprising:

a second channel sampling circuit corresponding to a second channel, coupled to the sensor array, comprising:

a second freezing circuit, for receiving the photon pulse signal, generated from the sensor unit of the sensor array, and a second channel selection signal to generate a second freezing signal, and for generating a second channel event signal to a second counting circuit in response to the second freezing signal and the photon pulse signal; and the second counting circuit, coupled to the second freezing circuit, for receiving the second channel event signal to generate and count a pulse number of the photon pulse signal received by the second channel;

wherein when the rising edge of the photon pulse signal occurs, the second freezing signal is kept at another previous state until the falling edge of the photon pulse signal occurs; the second freezing signal is kept at an ignore state when the first freezing signal is kept at a record state.

3. The optical time-of-flight sensor of claim 2, wherein when the second freezing signal is at the ignore state, the second freezing circuit does not generate the second channel event signal to the second counting circuit.

4. The optical time-of-flight sensor of claim 2, further comprising:

a third channel sampling circuit corresponding to a third channel, coupled to the sensor array, comprising:

a third freezing circuit, for receiving the photon pulse signal, generated from the sensor unit of the sensor array, and a third channel selection signal to generate a third freezing signal, and for generating a third channel event signal to a third counting circuit in response to the third freezing signal and the photon pulse signal; and the third counting circuit, coupled to the third freezing circuit, for receiving the third channel event signal to generate and count a pulse number of the photon pulse signal received by the third channel;

wherein when the rising edge of the photon pulse signal occurs, the third freezing signal is kept at another previous state until the falling edge of the photon pulse signal occurs; the third freezing signal is kept at the ignore state when the first freezing signal is kept at the record state.

5. The optical time-of-flight sensor of claim 1, wherein the freezing generation circuit comprises:

a first NAND gate, having a first input coupled to the first intermediate selection signal, having a second input coupled to the first freezing signal, and having an output; and a second NAND gate, having a first input coupled to the second intermediate selection signal, having a second input coupled to the output of the first NAND gate, and having an output for generating the first freezing signal.

6. The optical time-of-flight sensor of claim 1, wherein the event generation circuit comprises:

a third NAND gate, having a first input coupled to the first freezing signal, having a second input coupled to the photon pulse signal, and having an output for generating the first channel event signal to the first counting circuit.

7. A processing circuit disposed in an optical time-of-flight sensor, the processing circuit being externally coupled to a sensor array of the optical time-of-flight sensor, and the processing circuit comprises:

a first channel sampling circuit corresponding to a first channel, coupled to the sensor array, comprising:

a first freezing circuit, for receiving a photon pulse signal, generated from a sensor unit of the sensor array, and a first channel selection signal to generate a first freezing signal, and for generating a first channel event signal to a first counting circuit in response to the first freezing signal and the photon pulse signal; and the first counting circuit, coupled to the first freezing circuit, for receiving the first channel event signal to generate and count a pulse number of the photon pulse signal received by the first channel;

wherein when a rising edge of the photon pulse signal occurs, the first freezing signal is kept at a previous state until a falling edge of the photon pulse signal occurs; and, the first freezing circuit comprises:

a selection circuit, coupled to the first channel selection signal and the photon pulse signal, for generating an inverted channel selection signal based on the first channel selection signal, and for generating a first intermediate selection signal and a second intermediate selection signal based on the first channel selection signal, the inverted channel selection signal, and the photon pulse signal; the selection circuit comprises:

a first OR gate, having a first input coupled to the first channel selection signal, having a second input coupled to the photon pulse signal, and having an output;

an inverter, having an input coupled to the first channel selection signal, and having an output for generating the inverted channel selection signal based on the first channel selection signal; and a second OR gate, having a first input coupled to the output of the inverter, having a second input coupled to the photon pulse signal, and having an output;

the first OR gate receiving the first channel selection signal and the photon pulse signal to generate the first intermediate selection signal at the output of the first OR gate, and the second OR gate receiving the inverted channel selection signal and the photon pulse signal to generate the second intermediate selection signal at the output of the second OR gate;

a freezing generation circuit, coupled to selection circuit, for generating the first freezing signal in response to the first and second intermediate selection signals; and an event generation circuit, coupled to the freezing generation circuit, for generating the first channel event signal to the first counting circuit in response to the first freezing signal and the photon pulse signal.

8. The processing circuit of claim 7, further comprising:

a second channel sampling circuit corresponding to a second channel, coupled to the sensor array, comprising:

a second freezing circuit, for receiving the photon pulse signal, generated from the sensor unit of the sensor array, and a second channel selection signal to generate a second freezing signal, and for generating a second channel event signal to a second counting circuit in response to the second freezing signal and the photon pulse signal; and the second counting circuit, coupled to the second freezing circuit, for receiving the second channel event signal to generate and count a pulse number of the photon pulse signal received by the second channel;

wherein when the rising edge of the photon pulse signal occurs, the second freezing signal is kept at another previous state until the falling edge of the photon pulse signal occurs; the second freezing signal is kept at an ignore state when the first freezing signal is kept at a record state.

9. The processing circuit of claim 8, wherein when the second freezing signal is at the ignore state, the second freezing circuit does not generate the second channel event signal to the second counting circuit.

10. The processing circuit of claim 8, further comprising:

a third channel sampling circuit corresponding to a third channel, coupled to the sensor array, comprising:

a third freezing circuit, for receiving the photon pulse signal, generated from the sensor unit of the sensor array, and a third channel selection signal to generate a third freezing signal, and for generating a third channel event signal to a third counting circuit in response to the third freezing signal and the photon pulse signal; and the third counting circuit, coupled to the third freezing circuit, for receiving the third channel event signal to generate and count a pulse number of the photon pulse signal received by the third channel;

wherein when the rising edge of the photon pulse signal occurs, the third freezing signal is kept at another previous state until the falling edge of the photon pulse signal occurs; the third freezing signal is kept at the ignore state when the first freezing signal is kept at the record state.

11. The processing circuit of claim 7, wherein the freezing generation circuit comprises:

a first NAND gate, having a first input coupled to the first intermediate selection signal, having a second input coupled to the first freezing signal, and having an output; and a second NAND gate, having a first input coupled to the second intermediate selection signal, having a second input coupled to the output of the first NAND gate, and having an output for generating the first freezing signal.

12. The processing circuit of claim 7, wherein the event generation circuit comprises:

a third NAND gate, having a first input coupled to the first freezing signal, having a second input coupled to the photon pulse signal, and having an output for generating the first channel event signal to the first counting circuit.

13. A method of an optical time-of-flight sensor, comprising:

providing a sensor array having a plurality of sensor units; and providing and using a first channel sampling circuit corresponding to a first channel to perform:

receiving a photon pulse signal, generated from a senor unit of the sensor array, and a first channel selection signal to generate a first freezing signal;

using an event generation circuit to generate a first channel event signal to a first counting circuit in response to the first freezing signal and the photon pulse signal; and using the first counting circuit to receive the first channel event signal to generate and count a pulse number of the photon pulse signal received by the first channel;

wherein when a rising edge of the photon pulse signal occurs, the first freezing signal is kept at a previous state until a falling edge of the photon pulse signal occurs;

the step of receiving the photon pulse signal and the first channel selection signal to generate the first freezing signal comprises:

using a selection circuit to generate an inverted channel selection signal based on the first channel selection signal and to generate a first intermediate selection signal and a second intermediate selection signal based on the first channel selection signal, the inverted channel selection signal, and the photon pulse signal; and the selection circuit comprises:

a first OR gate, having a first input coupled to the first channel selection signal, having a second input coupled to the photon pulse signal, and having an output;

an inverter, having an input coupled to the first channel selection signal, and having an output for generating the inverted channel selection signal based on the first channel selection signal; and a second OR gate, having a first input coupled to the output of the inverter, having a second input coupled to the photon pulse signal, and having an output;

the first OR gate receiving the first channel selection signal and the photon pulse signal to generate the first intermediate selection signal at the output of the first OR gate, and the second OR gate receiving the inverted channel selection signal and the photon pulse signal to generate the second intermediate selection signal at the output of the second OR gate; and using a freezing generation circuit to generate the first freezing signal in response to the first intermediate selection signal and the second intermediate selection signal.

14. The method of claim 13, further comprising:

providing and using a second channel sampling circuit corresponding to a second channel to perform:

receiving the photon pulse signal, generated from the sensor unit of the sensor array, and a second channel selection signal to generate a second freezing signal;

generating a second channel event signal to a second counting circuit in response to the second freezing signal and the photon pulse signal; and using the second counting circuit to receive the second channel event signal to generate and count a pulse number of the photon pulse signal received by the second channel;

wherein when the rising edge of the photon pulse signal occurs, the second freezing signal is kept at another previous state until the falling edge of the photon pulse signal occurs; the second freezing signal is kept at an ignore state when the first freezing signal is kept at a record state.

15. The method of claim 14, wherein when the second freezing signal is at the ignore state, the second channel event signal is not generate and outputted to the second counting circuit.

16. The method of claim 14, further comprising:

providing and using a third channel sampling circuit corresponding to a third channel to perform:

receiving the photon pulse signal, generated from the sensor unit of the sensor array, and a third channel selection signal to generate a third freezing signal;

generating a third channel event signal to a third counting circuit in response to the third freezing signal and the photon pulse signal; and using the third counting circuit to receive the third channel event signal to generate and count a pulse number of the photon pulse signal received by the third channel;

wherein when the rising edge of the photon pulse signal occurs, the third freezing signal is kept at another previous state until the falling edge of the photon pulse signal occurs; the third freezing signal is kept at the ignore state when the first freezing signal is kept at the record state.

* * * * *